United States Patent [19]

Sandvos et al.

[11] Patent Number: 4,670,905
[45] Date of Patent: Jun. 2, 1987

[54] METHOD AND APPARATUS FOR COORDINATING INDEPENDENT COMMUNICATIONS SYSTEMS

[75] Inventors: Jerry L. Sandvos, Plantation, Fla.; Thomas A. Freeburg, Arlington Heights, Ill.

[73] Assignee: Motorola, Inc., Schaumburg, Ill.

[21] Appl. No.: 802,922

[22] Filed: Nov. 29, 1985

[51] Int. Cl.$^4$ .......................... H04B 1/00; H04B 7/00
[52] U.S. Cl. ........................................ 455/33; 455/56; 379/60
[58] Field of Search ............................ 455/33, 54, 56; 179/2 EB

[56] References Cited

U.S. PATENT DOCUMENTS

| | | |
|---|---|---|
| 3,819,872 | 6/1974 | Hamrick . |
| 3,913,017 | 10/1975 | Imaseki . |
| 4,144,411 | 3/1979 | Frenkiel . |
| 4,144,412 | 3/1979 | Ito et al. . |
| 4,144,496 | 3/1979 | Cunningham et al. . |
| 4,365,347 | 12/1982 | Otsuka et al. . |
| 4,475,010 | 10/1984 | Huensch et al. . |
| 4,481,670 | 11/1984 | Freeburg . |
| 4,485,486 | 11/1984 | Webb et al. . |
| 4,517,669 | 5/1985 | Freeburg et al. . |
| 4,519,068 | 5/1985 | Krebs et al. . |
| 4,525,861 | 6/1985 | Freeburg . |
| 4,527,284 | 7/1985 | Röttger . |
| 4,613,990 | 9/1986 | Halpern ................................ 455/33 |

OTHER PUBLICATIONS

Motorola, Inc.; "Advanced 800 MHz Trunked Radio Systems" Sales Brochure; Nov. 1982, p. 4.

*Primary Examiner*—Jin F. Ng
*Attorney, Agent, or Firm*—Raymond A. Jenski; Rolland R. Hackbart; Donald B. Southard

[57] ABSTRACT

A method and apparatus for coordinating the transfer of communications control from one independent radio communications system to another is disclosed. A remote unit which communicates data messages is associated with a home system which has a plurality of fixed sites and overlapping radio coverage areas. As the remote unit travels away from its home system, communications may be maintained by providing radio coverage from an independent roam system. The last message received by the home and roam systems from the remote unit has the associated radio signal strength and time of reception stored at each system. When a current message is transmitted by the remote unit and both the home and the roam system receive the message, the roam system time stamps the message and calculates the signal strength associated with the current message. If the amount of time elapsed between the last and the current message exceeds a predetermined amount of time or if the signal strength exceeds a predetermined threshold, the roam system requests transfer of control of the processing of the current message from the home system. When the home system receives this request, it calculates the difference in signal strength between the signal strength of the current message as received by the roam system and the signal strength of the current message as received by the home system. If the difference exceeds a predetermined amount, the request of the roam system to further process the message is granted.

15 Claims, 11 Drawing Figures

METHOD AND APPARATUS FOR COORDINATING INDEPENDENT COMMUNICATIONS SYSTEMS

BACKGROUND OF THE INVENTION

The present invention generally relates to intersystem coordination for maintenance of communication and more specifically relates to the method and apparatus useful for enabling a physically mobile remote unit to be able to automatically transmit and receive messages as it travels from the radio coverage area of one radio communications system to the radio coverage area of another, independent, radio communications system.

Radio communication services often grow in geographic extent such that a communication service radio coverage area offered by one coordinated system expands to reach if not partially cover areas which are already covered by a second coordinated but independent system. Typically, a mobile or portable radio transceiver (a remote unit) associated with one system would be denied service on the second system even though the radio frequencies in use may be compatible. Proposals have been advanced to enable a remote unit to be able to obtain service in a "foreign" system but generally such systems require the remote unit operator or his fixed station cocommunicator (dispatcher) to manually take some action to preregister in the foreign system. (See "Advanced 800 MHz Trunked Radio Systems" published by Motorola, Inc. as document RO-6-07 on November 1982, page 4).

Manual registration, besides being inconvenient for the user, forces the user to learn the radio boundaries of the systems so that the user must register in system A while in certain locations and in system B while in other locations. This boundary learning detracts from the user's main purpose for having a remote unit: to communicate his message. Furthermore, registration in one system may result in messages directed to the user in the other system to be lost because the user is no longer present there.

Automatic handoff of radio communications has been well developed in cellular radiotelephone systems and the equipment and processes necessary to the handoff are well known. Automatic handoff, however, occurs within a single coordinated system and not between separate systems. The body of knowledge regarding intrasystem handoff, therefore, is not of particular value when coordination between two independent systems is minimal.

SUMMARY OF THE INVENTION

Therefore, it is an object of the present invention to provide automatic transfer of communication capability as a remote unit travels from the radio coverage area of one system to the radio coverage of another system.

It is another object of the present invention to limit the required intersystem overhead communications.

It is a further object of tne present invention to consider the factor of time in the decision to transfer communication capability from one system to another.

Accordingly, these and other objects are achieved in the present invention of method and apparatus for coordinating intersystem transfer of communications processing between two independent communications systems. Briefly, the present invention enables the transfer of a remote unit, which transmits discontinuous messages, from one of a plurality of fixed sites of a first communications system to one of a plurality of fixed sites of a second system. One of the fixed sites associated with the first system receives a first message transmitted by the remote unit, calculates the radio signal strength value representation, and stores the representation. When the remote unit transmits a second message, a different fixed site associated with the second system may also receive the second message. The radio signal strength representation for this second message is calculated by the second system fixed site and compared to a predetermined threshold representation. A favorable comparison results in the second system fixed site requesting permission from the first system fixed site to process the remote unit's second message. The first system fixed site compares the second signal strength representation to the first system signal strength representation and may grant the permission request of the second system fixed site based on the comparison results. This grant results in the automatic transferring of the remote unit from the first radio communications system to the second radio communications system.

DETAILED DESCRIPTION OF THE PREFERRED EMBODIMENT

Figure 1:
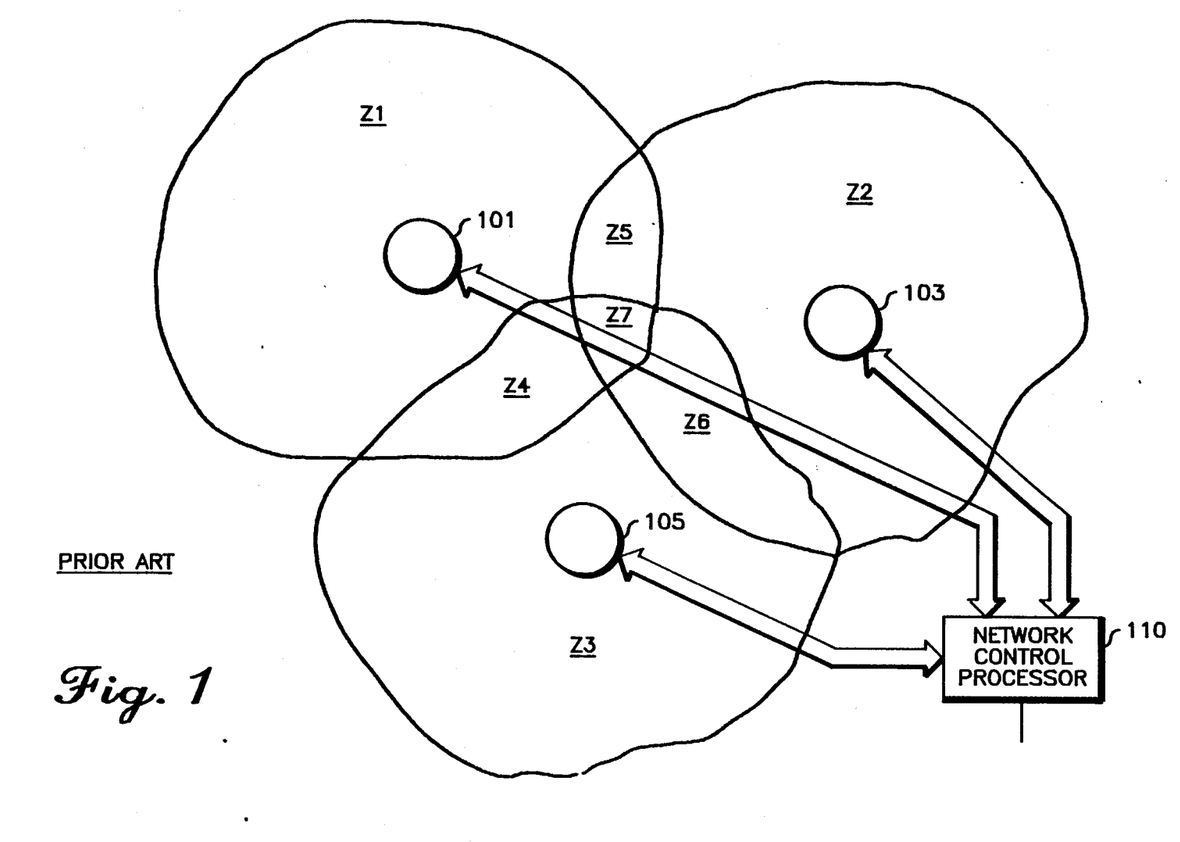
FIG. 1 is a representation of one fixed site of a conventional radio data communications system.

A fixed site of a conventional radio communication system is shown in FIG. 1. Here, a geographical area of radio coverage zones is illustrated as being served by three base sites 101, 103, and 105. Located at each site are radio transmitters and radio receivers (transceivers) and transceiver controlling devices (general communication controller—GCC). These transceivers may be any suitable commercially available transceivers such as those described in Motorola Instruction Manual 68P81013E65 and a GCC may be a suitable computer controlled device such as a GCC80 available from Motorola, Inc. Located in or nearby the geographical zones of the fixed site is a network control processor 110 which is coupled to the base sites 101, 103 and 105 in order that transmissions and receptions of messages may be routed and controlled.

A radio communication system such as that which may advantageously employ the present invention generally consists of a plurality of network control processors under the control of a higher order controlling function such as a paging executive (not shown in FIG. 1). An organization such as this is especially useful to provide data communications over a large geographic area segmented into contiguous and overlapping coverage zones organized into fixed sites as previously described. Although the system described herein is described in the context of a data only communication system, both data signals and analog signals such as voice signals can be communicated over the radio channels.

A plurality of mobile and portable transceivers, generically known as remote units (or portable terminals if a significant portion of the message communicated is data), may travel throughout the coverage area. The system of the preferred embodiment utilizes portable radios of compatible commercially available types such as those shown and described in U.S. Pat. Nos. 3,906,166; 3,962,553; or 4,486,624. Portable terminals (PT) employ such portable radios and generally include a receiver operable on a first radio carrier frequency and a transmitter operable on a second radio carrier frequency.

Figure 2:
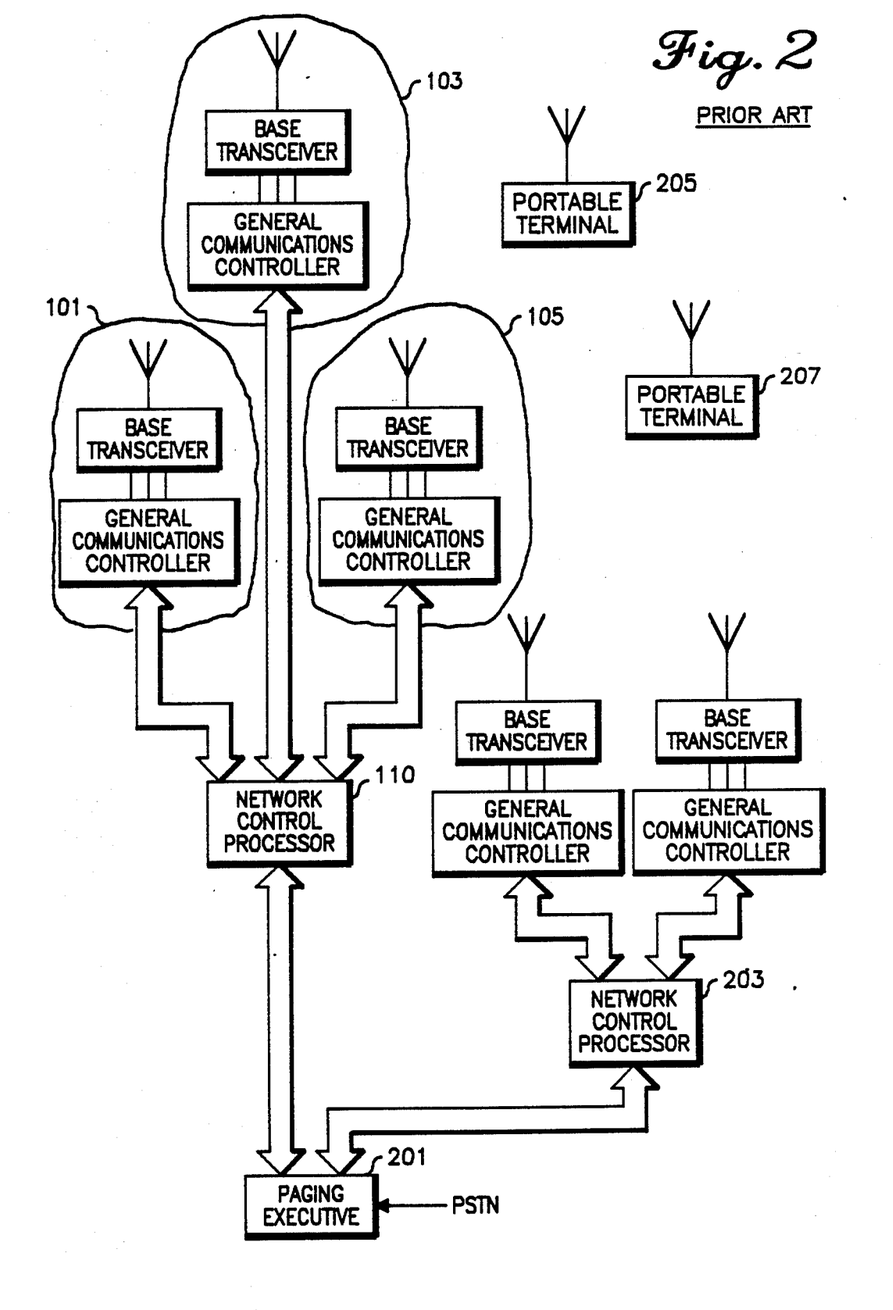
FIG. 2 is a block diagram of the equipment which may conventionally be found at a fixed site such as that of FIG. 1.

Referring now to FIG. 2, it is shown that the fixed site including the network control processor 110 may be coupled to a paging executive (PEX) 201 which, in a data communication system, may be a host computer and may control a number of network control processors illustrated by network control processors 203 and 110. In the preferred embodiment, paging executive 201 may gather data from, and dispatch data to, portable transceivers located throughout the geographic area. A similiar type of system is shown and described in U.S. Pat. No. 4,525,861 assigned to assignee of the present invention.

In operation, the network control processor 110 transmits message signals to and receives message signals from portable terminals (PTs-illustrated as PTs 205 and 207) via a base transceiver and a GCC. The message signals may include a binary preamble, a predetermined synchronization word, an information word containing a command, status or data, and one or more data words. The format of the data packets may be any of a number of existing data formats and may be one those shown and described in U.S. Pat. Nos. 4,517,669 and 4,519,068 assigned to the assignee of the present invention.

Message signals, which may be received from the public switched telephone network (PSTN), public data networks, or another PT, are routed by the paging executive (PEX) 201 to a selected network control processor (NCP) 110 for transmission by one of its corresponding base transceivers. Since the message signals are not transmitted on all transmitters simultaneously as in simulcast systems, it is necessary that the paging executive (PEX) or NCP110 201 have a reasonably accurate indication of the location of each portable transceiver with relation to the radio coverage zones of the base transceivers. Thus, the paging executive (PEX) 201 or NCP110 may select the proper transmitter of a base transceiver which covers the zone in which a particular portable transceiver is located. The paging executive (PEX) 201 may also interface with the public switched telephone network (PSTN) to receive and transmit messages therefrom and operate as described in U.S. patent application Ser. No. 608,334 filed in behalf of Zabarsky et al. on May 8, 1984 and assigned to the assignee of the present invention.

Referring again to FIG. 1, it can be seen that the geographic area covered by this fixed site may be divided into seven zones, Z1-Z7 which are radio coverage zones generated by the transmitters of the base sites 101, 103, and 105. Each time a portable terminal (PT) transmits, signal strength readings are taken by the receivers of the base sites 101, 103, and 105. These readings may be used by each GCC associated with the receiving receivers to compute an adjusted signal strength representation for each of the zones Z1-Z7 by digitizing and adjusting the measured signal strength for each receiver by a corresponding predetermined factor associated with the particular zone and the particular receiving equipment. A similar technique is shown and described in U.S. Pat. No. 4,481,670 assigned to the assignee of the present invention.

The predetermined factors used to compute the adjusted signal strength representations depend upon a number of factors such as the terrain, the height and gain of the antennas, and the sensitivity of the receivers. In other words, the predetermined factors associated with each zone are empirically determined and depend upon the characteristics, equipment, and terrain encountered at each fixed site. These predetermined factors can be arranged in a zone selection matrix which can then be used oy the paging executive (PEX) 201 and the network control processor (NCP) 110 to identify the zone which has the largest adjusted signal strength for a particular transmission from a portable terminal. The selected zone for a particular portable terminal data message transmission may be stored with other data in a location of the memory of the paging executive 201 or the serving network control processor associated with that portable terminal. Additionally, the entire zone selection matrix may be stored thereby providing a composite history of all of the receivers which received the last PT transmission and the adjusted signal strength representation at each. In this way, a message to be transmitted to the particular PT can be directed to the zone having the best signal strength.

Whenever transmitting a message to a particular portable terminal such as portable terminal 205, the paging executive 201 or NCP110 will first cause the message to transmitted on the carrier frequency of the transmitter which covers the zone which had the largest adjusted signal strength for the last transmission from portable terminal 205. Information identifying both that zone and the transmitter covering it are stored in the memory of network control processor 110 or paging executive 201. If the portable terminal (PT) 205 does not acknowledge the transmission of the message, the paging executive (PEX) 201 or NCP110 may attempt one or more retransmissions of the message via the selected transmitter. If the retransmissions likewise are not acknowledged by the PT 205, the paging executive (PEX) 201 or NCP110 may then cause the transmission of the message via the base transceiver transmitter covering the zone which had the second largest adjusted signal strength during the last transmission from PT 205.

Again, if PT 205 does not acknowledge the transmission, the message may again be transmitted one or more times via that selected transmitter. If the PEX 201 or NCP110 does not reach the selected PT by means of these two base transceiver transmitters, PEX 201 or NCP110 may either select another transmitter covering the last fixed site receiving the PT 205 message, or it may initiate a polling sequence in which PT 205 is polled in every fixed site in the data communication system. If no acknowledgement is received from the PT, the message may be stored as will be described later.

Figure 3:
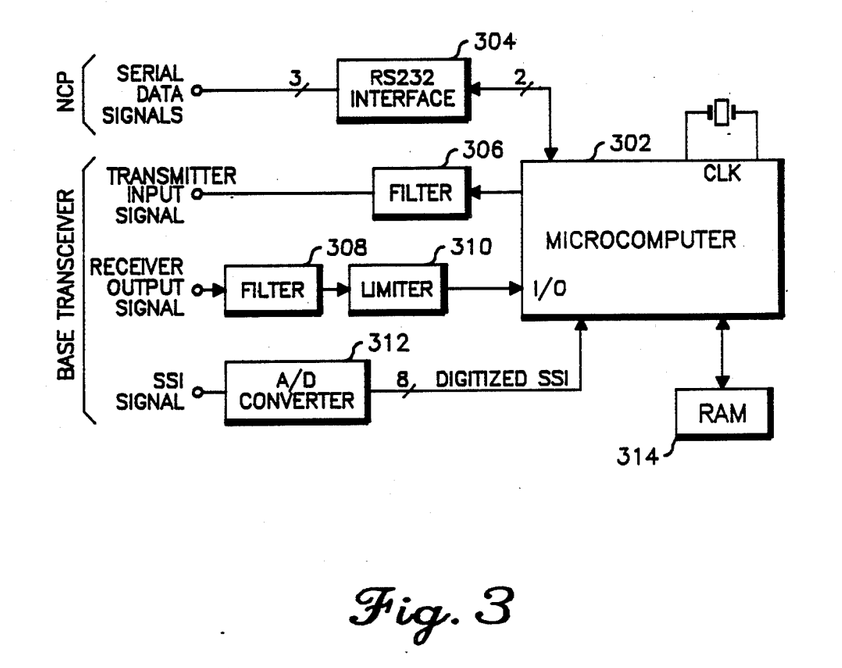
FIG. 3 is a block diagram of a general commmunications controller which is found at a fixed site such that of FIG. 1 and which may be employed in the present invention.

A block diagram of a typical GCC (general communication controller) is shown in FIG. 3. Each GCC includes a microcomputer 302 having a memory with stored program therein for communicating with an NCP (network control processor) and the portable terminals via an associated base transceiver. Microcomputer 302 can be any suitable commercially available microcomputer such as the Motorola types MC6800, MC6801, MC6805, or MC68000 microprocessor.

Microcomputer 302 is coupled to a conventional RS232 interface 304 which may, in turn, be coupled by a high speed modem (not shown) to a dedicated telephone line or other communication channel connected to an NCP (such as NCP 110 shown in FIG. 2). Message signals destined for a PT are received by microcomputer 302 from NCP 110 and are assembled into variable length messages. These assembled messages are coupled to filter 306 and thereafter applied to its corresponding base transceiver transmitter.

Messages received from a portable terminal are coupled to conventional filter 308 and thereafter to conventional signal limiter 310 for conversion of the analog signals into a nonreturn-to-zero binary signal. The output of limiter 310 is applied to an input port of microcomputer 302 which subsequently decodes the information and data therein.

Microcomputer 302 also accepts radio signal strength readings from the base transceiver receivers to which the NCP is coupled while it is receiving messages. The signal strength indicator (SSI) signals from the receivers receiving a PT message are coupled to conventional A/D converter 312 which may continuously convert the analog SSI signal to a digitized SSI signal having 8 bits. The digitized SSI signal from A/D converter 312 is applied to an input port of microcomputer 302. Several A/D conversions are performed while a PT message signal is being received. The digitized SSI signals for the several conversions are averaged by the microcomputer 302. The average SSI signal is then appended to the received data message and sent by microcomputer 302 via RS232 interface 304 to NCP 110 and, if required by system design to PEX 201. The information and SSI data from the received data message may be coded in any suitable conventional format for transmission to the NCP 110.

Figure 9:
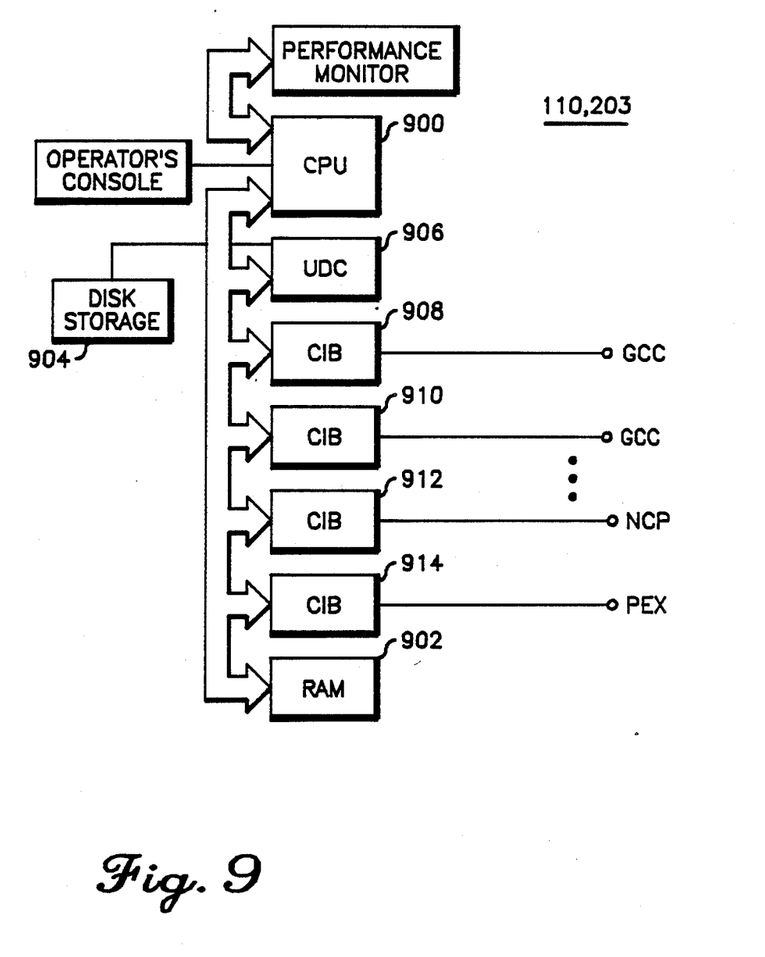
FIG. 9 is a block diagram of a network control processor such as that employed in the preferred embodiment.

A network control processor such as that employed in the preferred embodiment is shown in FIG. 9. NCP 110 or 203 is controlled by a central processing unit (CPU) 900 which may be a high end microprocessor similar to an MC68000, MC68010, or MC68020 manufactured by Motorola, Inc. or similar type. Also contained within the CPU 900 is a limited amount of on-board memory and two serial ports. Primary memory may be provided by dynamic random access memory (RAM) 902 and may be backed-up by a disk storage 904. The disk storage enters the microprocessor via a universal disk controller (UDC) 906, such as that available from Motorola, Inc. as an NLN1684A.

Interface with other elements of the communication system is accomplished via communication interface boards (CIB) 908, 910, 912, and 914. A CIB is a general purpose interface board, for example, an NLN1685A available from Motorola, Inc. which performs the interface between the processor bus and RS232-compatible external devices in a conventional fashion. Connection between an NCP and the PEX 201 is achieved via a CIB such as is shown employing CIB 914.

The NCP's functions are to coordinate the communications from the PEX 201 to the proper transceiver through a GCC and vice versa. The NCP 110 maintains lists of the active portable terminals in the system with such information as the last call in, the received signal strength representations for each transceiver receiving the inbound transmission, and a list of most probable transmitters for outbound transmissions. The NCP maintains the Zone Selection Matrix and uses this matrix to calculate signal strength values as described in U.S. Pat. No. 4,481,670. It is the NCP 110 that first detects that a transmission from a particular portable terminal is not registered in the local system and makes the preliminary decision concerning the disposition of the message based on files local to the NCP. A portable terminal message, that is not registered, is not automatically acknowledged, but the information is forwarded to the PEX for disposition, as described later.

Figure 4:
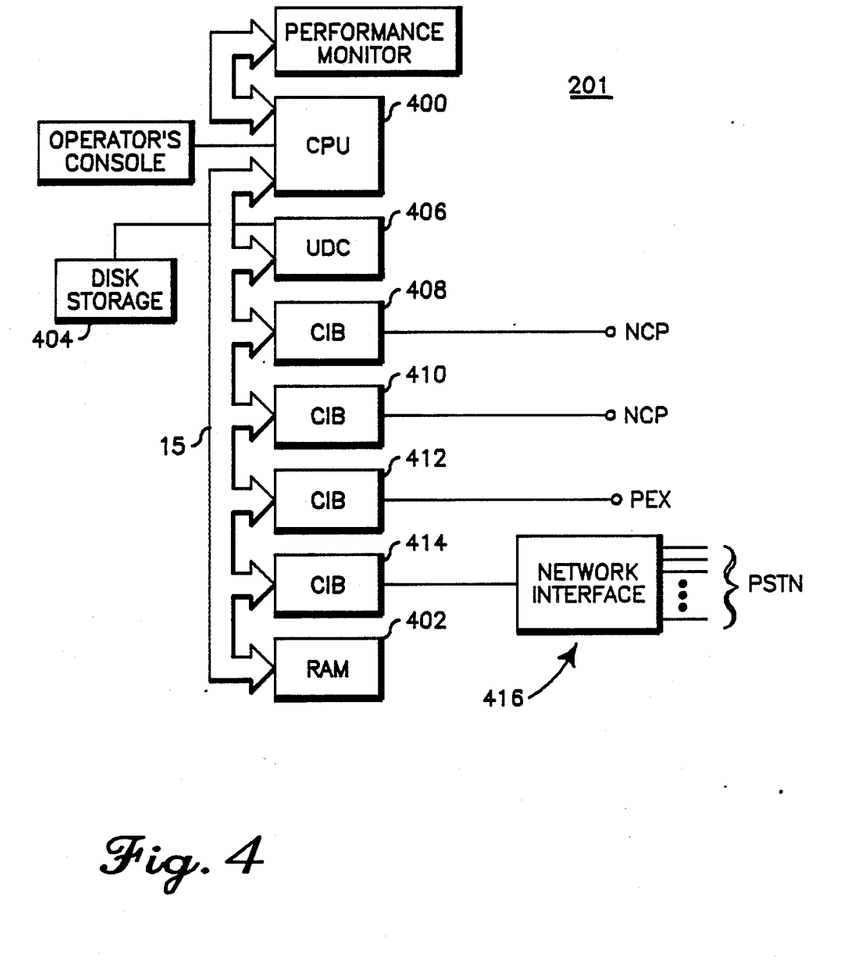
FIG. 4 is a block diagram of the paging executive of FIG. 2 and which may be employed in the present invention.

A paging executive such as that employed in the preferred embodiment is shown in FIG. 4. PEX 201 is controlled by a central processing unit (CPU) 400 which may be a high end microprocessor similar to an MC68000 manufactured by Motorola, Inc. or similar type. Also contained within the CPU 400 is a limited amount of on-board memory and two serial I/O ports. Primary memory may be provided by dynamic random access memory (RAM) 402 and may be backed-up by a disk storage 404. The disk storage enters the microprocessor via a universal disk controller (UDC) 406, such as that available from Motorola, Inc. as an NLN 1684A.

Interface with other elements of the communication system is accomplished via communication interface boards (CIB) 408, 410, 412, and 414. A CIB is a general purpose interface board, for example, an NLN 1685A available from Motorola, Inc., which performs the interface between the processor bus and RS232 compatible external devices in conventional fashion. Connection between an NCP and the PEX 201 is achieved via a CIB such as is shown employing CIB 408 and CIB 410.

Interface between PEX 201 and PEXs of other communication systems may be realized via another CIB 412. Additionally, interface to the public switched telephone network (PSTN) or other communication networks may be achieved via a CIB 414 and a network interface 416.

Messages directed to a PT are typically stored on disk storage 404 with the PT's unique address so that messages may be recalled and transmitted to the PT at an appropriate time, such as when a PT has not acknowledged a page but is now requesting the PEX 201 to deliver stored messages. Messages which have been recalled and all messages which are awaiting transmission are placed in a transmission queue in RAM 402 before being transmitted. The messages stored in disk storage 404 are held for a predetermined period of time, for example 24 hours, and then deleted from storage. Message statistics, such as time-of-message receipt in the PEX, time-of-message acknowledgment, number of characters in the message, and PT location when the message was acknowledged, are retained for user billing and audit trail purposes.

Figure 5:
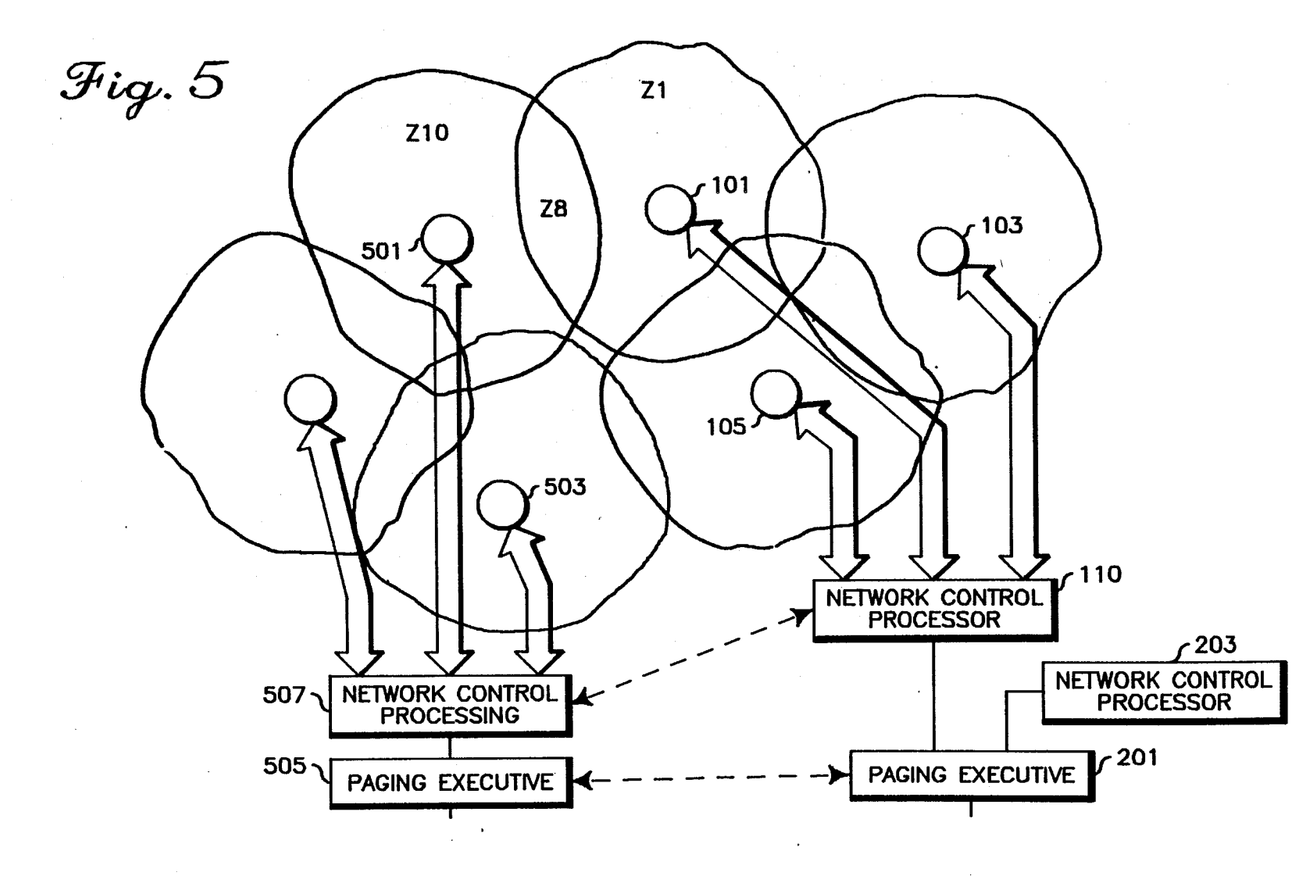
FIG. 5 is a representation of the intersection of the radio coverage areas of two independent radio communications systems which may employ the present invention.

Relative PT location is an important element in the operation of a data communication system such as been described. PT location becomes increasingly important as additional independent communication systems come into existance. When two independent systems are constructed adjacent to one another, as shown diagrammatically in FIG. 5, unique problems in PT location and service continuation between systems become apparent. If a PT were to travel into that part of zone Z1 which overlaps zone Z10 of the adjacent system, i.e. zone Z8, signal strength information which would be gathered by a receiver at base site 501 would not normally be made available to the paging executive 201 and network control processor 110 because the systems are wholly independent. A full exchange of data could, of course, be arranged between the two systems but in a practical situation, such as where the systems are under ownership of different parties, this exchange is likely to be limited. In the present invention, which seeks to enable continuation of communication services, a limited data exchange may be accomplished between respective PEX's (such as that between PEX 201 and PEX 505) or between NCP's (such as between NCP 110 and NCP 507). If the two communication systems share the same set of radio frequencies the data line will, in the preferred embodiment, be established between the two NCP's via a CIB; if the systems do not share the same frequencies the data line should be established between the two PEX's also via a CIB.

In order to accomplish the intersystem control, a PT location file is maintained at each PEX which can share messages. Included in each PEX location file is a list of PT addresses for those PT's which are registered in, and are billed from, that PEX (the "home" system). Also included in the file are the locations of those home PT's which have traveled ("roamed") to another ("roam") system, and the addresses of those PTs which have roamed to this system from another system.

Figure 6:
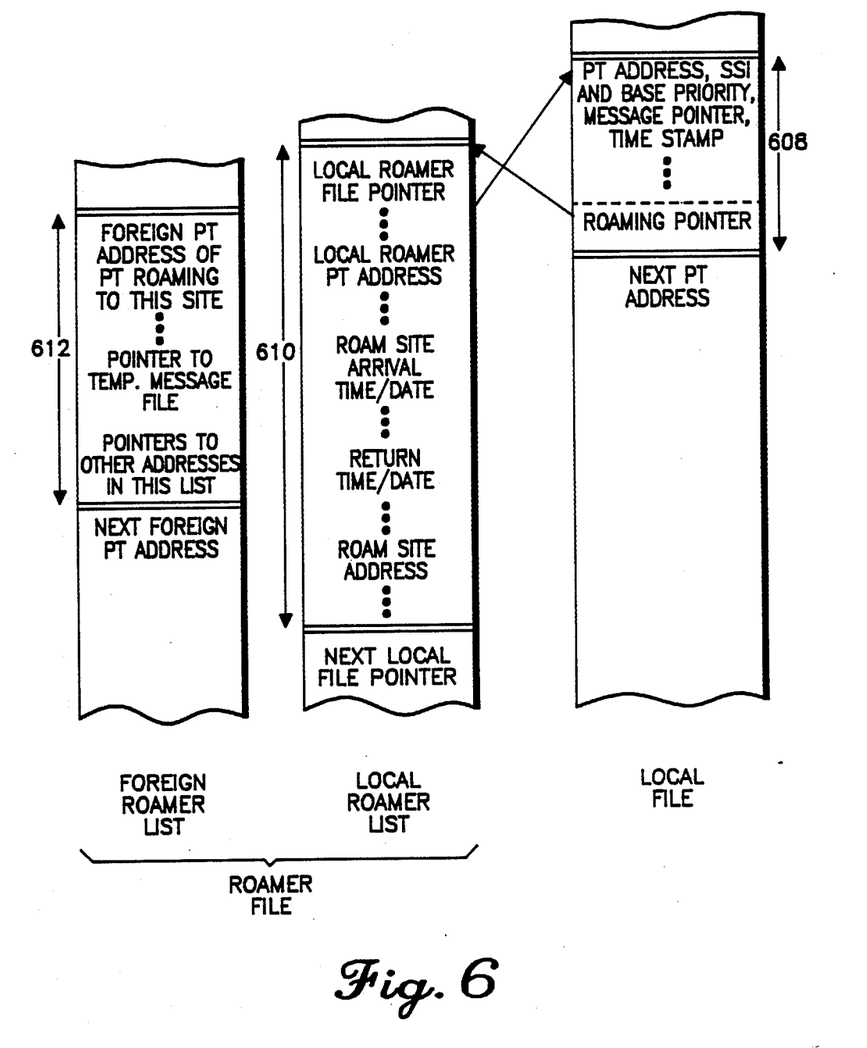
FIG. 6 is a representation of the files which may be kept in the paging executive employed in the present invention.

As diagramed in FIG. 6, the location file consists of three lists: a local file, a local roamer file, and foreign roamer list. The information included in the local or "home PT" file 608 consists of the PT address, the base transceiver receiver's signal strength indicator values and priority established therefrom, a pointer to the memory location where messages for this PT may be found, a time stamp when the last message producing signal strength indication was received, and a roaming pointer to the roamer file if the home PT has roamed. The roamer file essentially consists of two lists, a local roamer list and a foreign roamer list. Since the local file contains the permanent record of each PT registered in the home system and is scanned whenever a message is directed to a PT, a roaming pointer field is included with the PT record 608 whenever a home PT roams to another system. This pointer directs the PEX to the local roamer list and to this specific local roamer record 610 associated with the roaming PT. The roamer record 610 contains a pointer back to the local file, the address of the PEX to which the PT has roamed, and the date and time the PT appeared in the foreign system.

The foreign roamer list contains a "foreign" PT file 612 which consists of a message location pointer and the address of those "foreign" PTs (PTs not registered or billed in this local system) which have roamed into the local system and which have been active, that is, initiated or received messages within a preceding period of time such as the past 24 hours. This file is used primarily to allow the PEX to quickly deliver a response to a message directed to a roaming foreign PT by allowing the PEX to search the foreign roamer list and find an address of foreign active PT rather than causing PEX to send an inquiry back to the foreign PT's home system and receiving a location message. This reduces the amount of traffic between system. Description of a similar filing system may be found in U.S. patent application Ser. No. 608,334 filed on behalf of Zabarsky et al. on May 8, 1984.

An important feature in the present invention, then, is the method for coordinating the message delivery and service grants to roaming PTs. The method employed by the preferred embodiment is diagrammed as a flowchart in FIG. 7a and FIG. 7b. It is expected that a PT will generate a series of discontinuous data messages as the PT user uses his PT. Since this equipment is, in the preferred embodiment, a portable unit, it is expected that the user will easily carry the PT between radio zones and into an adjacent system. As he travels across the intertace zone, Z8, a decision must be made by the systems to transfer the PT service at some point from one system to the other if continuous service is to be realized. In zone Z8, of FIG. 5, the PT data message may be received by both the base site 101 receiver and the base site 501 receiver. This reception at two base transceivers of two independent systems is shown as steps 701 and 703 in the flowchart of FIG. 7a. Considering first the steps taken by the roam system in the control of the PT communication, the PT message is given an indication of the time of reception (shown as time stamp step 705) and becomes a permanent part of the message. The zone signal strength value is then calculated (at step 707) from the SSI signal described previously. The message is stored (at step 708) in the RM of the NCP until a decision is made whether the roam system is to process the message further. A determination of whether the roam system is already providing service to this PT is made at decision block 709, where a positive response to this decision allows the PT communications to be processed normally at 711. A negative response moves to step 713. If the PT is to be denied service in this system, such as for nonpayment of bills, a determination is made at step 713 whether this PT is on the "black list" of undesirable units kept as part of the foreign roamer list. A positive response to the decision results in the PT address being removed from the system list at 715 and a negative response allows the process to move to step 717. If the PT address is not in the roamer file, as determined at 717, it is placed there at step 719. A comparison of the most recent time stamp to the last time stamp and a comparison of current to last message signal strength values is made at the decision block 721.

Figure 7A:
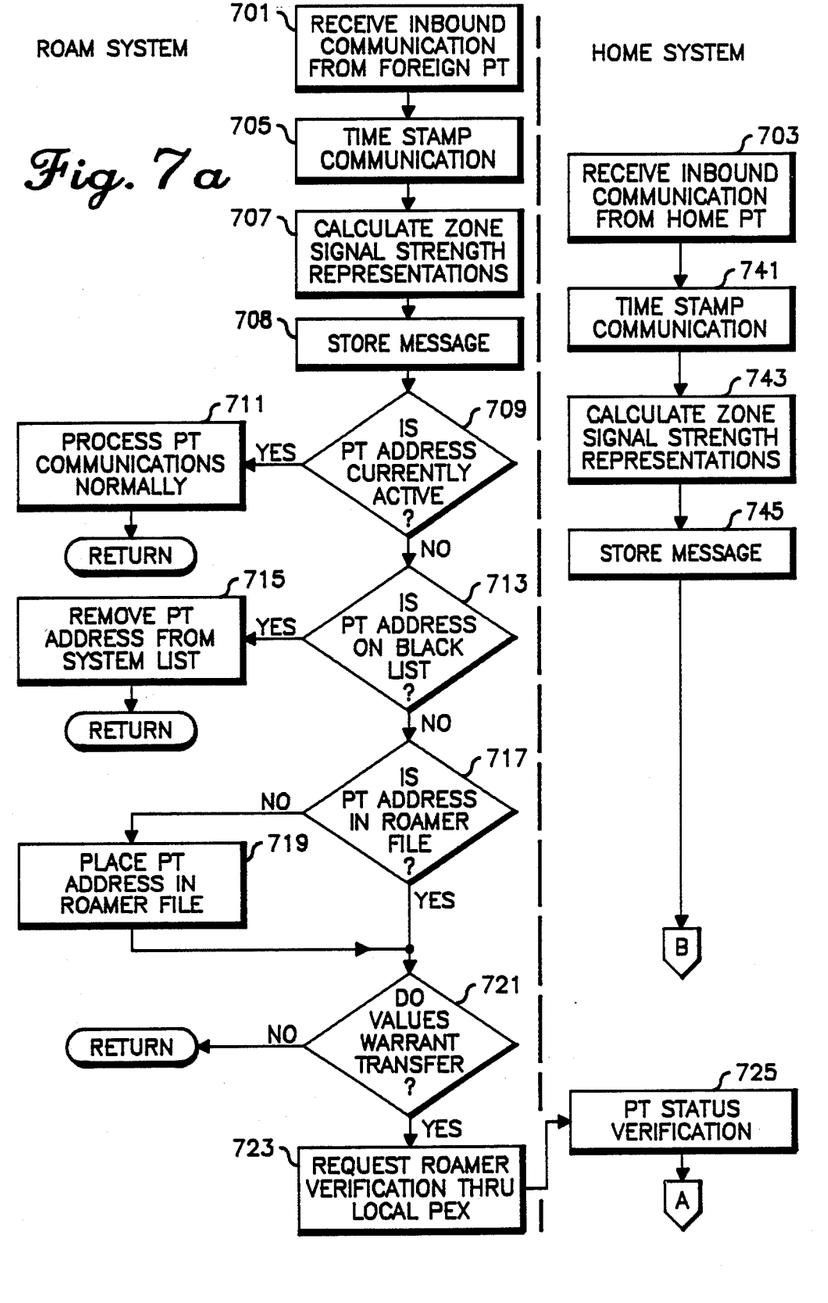
FIGS. 7a and 7b, combined, are a flowchart of the method of transferring communications capability for a remote unit from a home communications system to a roam communications system and which may be employed in the present invention.

A feature of particular advantage in the present invention is that of employing the time stamp recorded with the last received message to determine whether the signal strength values last stored are "fresh" enough to be used in determining the relative position of the highly mobile PTs. Briefly, the time stamp may be generated by a real time clock at the roam system NCP receiving the message and coded and stored in numeric or ASCII form with the received message and signal strength representations. Alternately, the real time clock and storage may be maintained at the PEX depending upon the requirements of the system. The stored clock values for a previous message may be compared to a newly received message time stamp at the NCP or PEX.

In order to decide whether the time and signal strength representations warrant a transfer of the PT to the roam system from the home system, a comparison is made of the current values at the home system to the values communicated by the roam system. Additionally, if the time stamp and the most recent message received by the roam system is more current than the values stored in the home PEX by a predetermined amount, which in the preferred embodiment is from one to five minutes, it is decided that a transfer is warranted. Alternately, if the two time stamps indicate messages occuring within the predetermined amount, the largest three adjusted values of the stored home system signal strength representations are compared with the most recent received signal strength adjusted values. Current values of one or more adjusted signal strength readings in the roam system which exceed a predetermined threshold, creates a positive response to the decision of whether the values warrant a transfer. This threshold is empirically determined for each site and is function of the terrain, the useable sensitivity of the receivers, and other site-specific parameters.

Figure 7B:
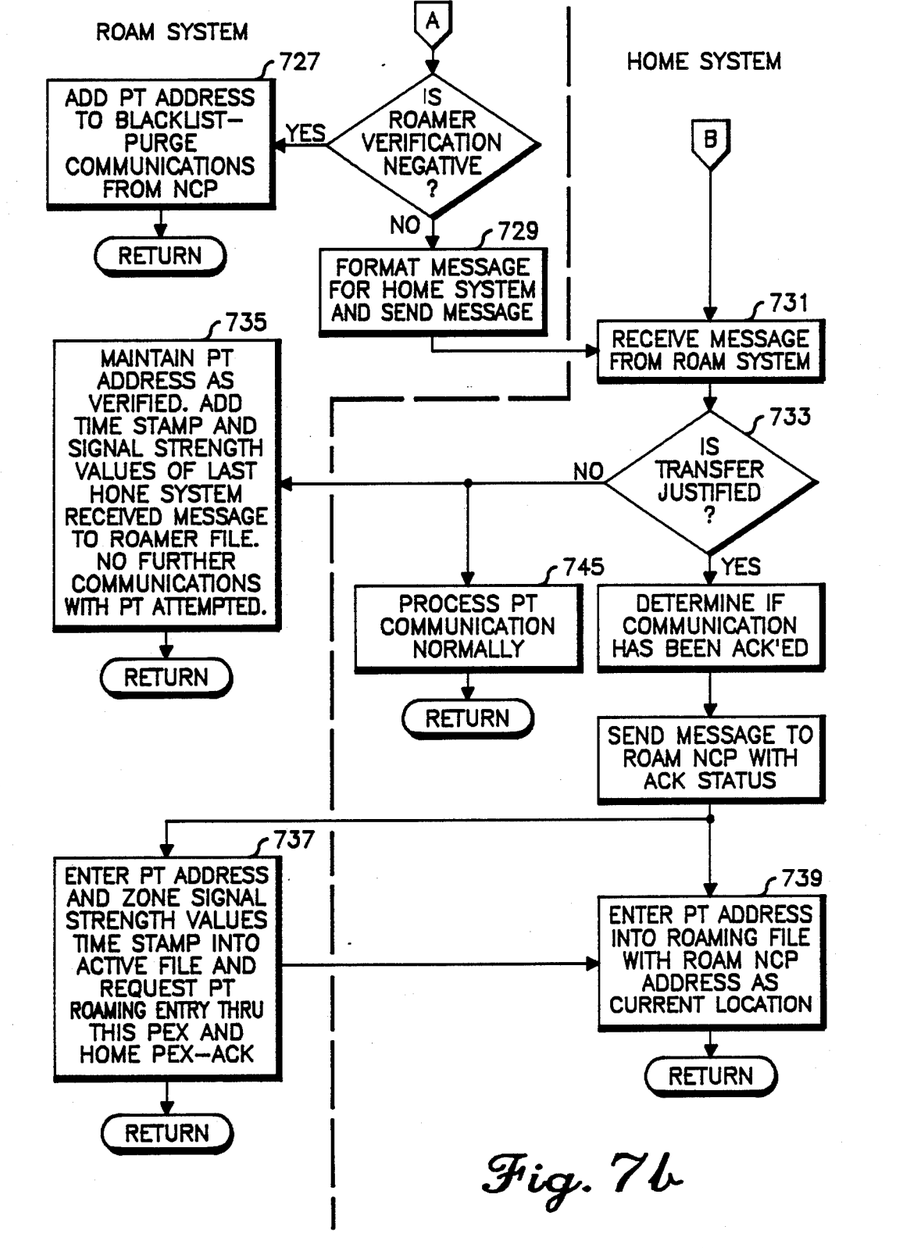

Given a positive decision at 721, a request is made of the home system to verify the status of the service-requesting PT at 723. A PT status check is made at the home system at 725 and a response is returned to the roam system. Referring now to FIG. 7b, if the verification is negative, the PT address is added to the black list and all communication is purged from the receiving NCP at 727. A nonnegative roamer verification causes the roam system to format a request message for the home system at 729. This message includes the PT address, the received time stamped, and the three largest signal strength values measured by the base transceiver receivers.

The home system receives the request message from the roam system (shown at 731) via the intersystem data link and the home system decides whether a transfer of the PT is justified based on a site specific predetermined ratio of adjusted signal strength at the roam system to the adjusted signal strength at the home system at 733. If the transfer is not justified, a message is returned to the roam system including the time stamp and signal strength representations of the last home system message received. The roam system, then, attempts no further communication with the PT regarding this latest received message as shown as step 735. If the transfer is justified, a message so stating is transmitted to the roam system which responsively enters the PT address zone signal strength representations and time stamp into its active file and requests the PT to be recorded as a local roamer in its home system file through the roam and home PEX at step 737. The home system subsequently enters the PT address into its roaming file with the current PT location at step 739.

While the roam system performs its calculations, the home system time stamps the same received inbound communication from step 703 at step 741 and calculates the zone signal strength representations at step 743. If the transfer is not justified as described previously for step 733, the home system processes the PT communication in a normal fashion at step 745.

Figure 8A:
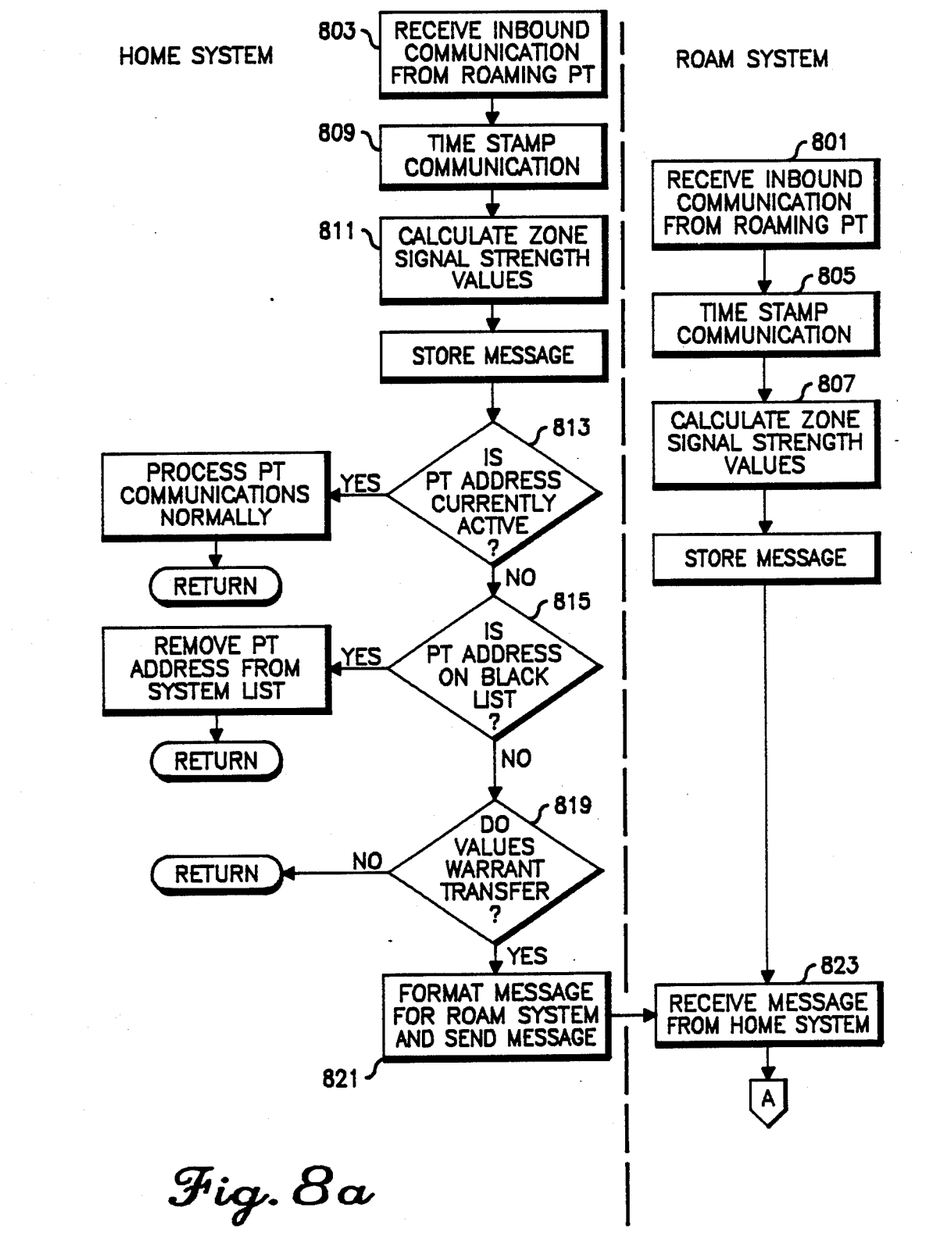
FIGS. 8a and 8b, combined, are a flowchart of the method of transferring communications capability for a remote unit from a roam communications system to a home communication system and which may be employed in the present invention.
Figure 8B:
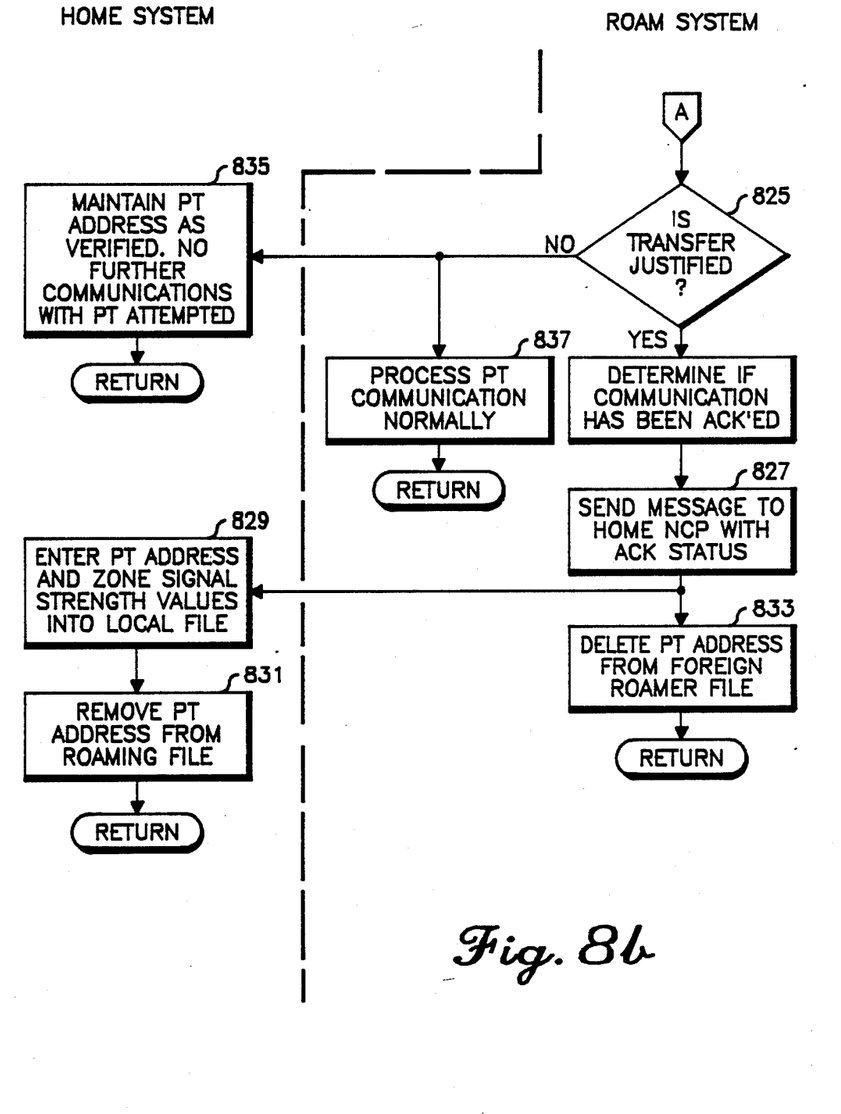

A similar method of PT transfer occurs when the PT returns into its home system. A flowchart describing a preferred embodiment is shown in FIGS. 8a and 8b. A transmission from a PT which has previously left the coverage areas of its home system and has obtained service from a roam system may be received in both the roam and the home systems (as indicated at 801 and 803). Since both systems can provide service, a decision must again be made whether to transfer the message providing service back to the home system. As in the transfer from the home system to the roam system described in the method of FIGS. 7a and 7b, the system currently providing service makes the final determination whether a transfer of communication services should occur. The system not providing service but receiving the PT transmission, however, may request transfer of communications.

Returning to FIG. 8a, upon receiving a transmission from PT, both the service-providing roam system and the home system time stamp the incoming communication and calculate the zone signal strength values (shown at steps 805, 807 and 809, 811 respectively). The home system subsequently determines if the PT is being serviced from the home system (at step 813) and if the PT address is on the black list (at step 815). Given that the address of the PT whose transmission has been received is currently in the local roamer file but is neither on the black list nor currently served from the home system, a determination is made at step 819 if the time stamp and signal strength representations warrant a transfer to the home system. If the representations warrant a transfer, a message is formatted and transmitted (at step 821) to the roam system providing service (as recorded in the local roamer file). The home system need not obtain PT address verification from any other system because the home system itself maintains the service verification for its home PTs.

The roam system receives the home system transfer request (at 823) and determines whether a transfer is justified (at 825 in FIG. 8b). If the transfer is granted, a message is sent to the home system (at 827) and the home system in response enters the zone signal strengths into the PT home file at 829 and removes the PT address from the local roaming file at 831. The roam system deletes the PT address from its foreign roamer file (at 833) following its grant of communication transfer. If the transfer is not granted the roam system notifies the home system (which does not respond to the PT's transmission at 835) and processes the PT's transmission in a normal fashion at 837.

Thus, coordination between at least two independent communication systems may be achieved with the present invention. A radio transmission by a physically mobile PT may be received by receivers in the plurality of systems thereby making a decision process necessary in order to select a system and provide optimum communications capability for the PT user. Although it is possible for all decisions to be made by the PT's home system, an extensive mount of interface between the home system and a roam system would be required. The present invention enables the decision as to which system can provide the best communication to be made by the system last providing service to the PT. A request by another system to transfer communication service cannot be made unless the radio signal strength and timing of the PT transmission meet certain unique requirements.

Therefore, while a particular embodiment of the invention has been described and shown, it should oe understood that the invention is not limited thereto since many modifications may be made those skilled in the art. It is therefore contemplated to cover by the present application any and all such modifications that fall within the true spirit and scope of the basic underlying principles disclosed and claimed herein.

I claim:

1. A coordinating apparatus for transfer of communications processing from a first independent communications system to a second independent communications system, each system having a plurality of fixed sites associated therewith and providing at least one radio channel at each fixed site which may be employed by a remote unit for communication of discontinuous messages, the coordinating apparatus comprising:

means at a first fixed site, associated with the first communications system, for receiving a first message from the remote unit and for calculating and storing a radio signal strength representation for said first message;

means at a second fixed site, associated with the second communications system, for receiving a second message and calculating a radio signal strength representation for said second message from the remote unit;

means at said second fixed site for comparing said second message signal strength representation to a threshold representation and, responsive to said comparison, for conveying said second message signal strength representation and for requesting permission from said first fixed site to process said second message; and means at said first fixed site, responsive to said permission request for comparing said second message signal strength representation to said stored first message signal strength representation and for granting said second fixed site request in response to said first and second signal strength representation comparison result, thereby transferring said remote unit communications processing from the first communications system to the second communication system.

2. A coordinating apparatus in accordance with claim 1 further comprising means at said first and second fixed sites for inserting a time stamp in any message received, thereby indicating the time of message reception.

3. A coordinating apparatus in accordance with claim 2 further comprising means at said second fixed site for receiving said first message, calculating a signal strength representation at said second fixed site for said first message, inserting a time stamp in said first message, and storing said time stamp, said representation, and said first message.

4. A coordinating apparatus in accordance with claim 3 further comprising means for generating said thershold representation at said second fixed site from said first message signal strength representation stored at said second fixed site.

5. A coordinating apparatus in accordance with claim 3 further comprising means at said second fixed site for recalling said first message time stamp and comparing said first message time stamp to said second message time stamp.

6. A coordinating apparatus in accordance with claim 5 further comprising means at said second fixed site, responsive to said time stamp comparison indicating a difference in time greater than a predetermined amount, for requesting permission from said first fixed site to process said second message.

7. A coordinating apparatus in accordance with claim 1 wherein said first and said second messages are the same message received at said first and said second fixed sites, respectively.

8. A coordinating apparatus in accordance with claim 1 wherein said first and second fixed sites each further comprise at least two base transceivers with unique radio coverage zones.

9. A coordinating apparatus in accordance with claim 1 wherein said signal strength representation of said first and second messages further comprises signal strength values from each base transceiver of said first and second fixed sites.

10. A method of coordinating transfer of communications processing from a first independent communications system to a second independent system, each system having a plurality of fixed sites associated therewith and providing at least one radio channel at each fixed site which may be employed by a remote unit for communication of discontinuous messages, the method of coordinating transfer comprising the steps of:

receiving, at a first fixed site associated with the first communications system, a first message from the remote unit and calculating and storing a radio signal strength representation for said first message;

receiving a second message from the remote unit and calculating a radio signal strength representation for said second message at a second fixed site associated with the second communication system;

comparing, at said second fixed site, said second message signal strength representation to a threshold representation and, responsive to said comparison result, requesting permission from said first fixed site to process said second message; and comparing, in response to said request, said second message signal strength representation to said stored first message signal strength representation at said first fixed site and granting said second fixed site request in response to said first and second signal strength representation comparison result, thereby transferring said remote unit communications processing from the first communications system to the second communications system.

11. A method in accordance with the method of claim 10 further comprising the step of inserting a time stamp in any message received at said first and second fixed sites, thereby indicating the time of message reception.

12. A method in accordance with the method of claim 11 further comprising the steps of receiving said first message at said second fixed site, calculating a signal strength representation at said second fixed site for said first message, inserting a time stamp in said first message, and storing said time stamp, said representation, and said first message at said first fixed site.

13. A method in accordance with the method of claim 12 further comprising the step of generating said threshold representation at said second fixed site from said first message signal strength representation stored at said second fixed site.

14. A method in accordance with the method of claim 12 further comprising the steps of recalling said first message time stamp and comparing said first message time stamp to said second message time stamp at said second fixed site.

15. A method in accordance with the method of claim 14 further comprising the step of requesting permission by said second fixed site from said first fixed site to process said second message in response to said time stamp comparison step indicating a difference greater than a predetermined amount.

* * * * *